United States Patent
Ugajin et al.

(10) Patent No.: US 10,460,116 B2
(45) Date of Patent: Oct. 29, 2019

(54) ACCESS CONTROL METHOD, SYSTEM AND STORAGE MEDIUM

(71) Applicant: SUMITOMO MITSUI BANKING CORPORATION, Tokyo (JP)

(72) Inventors: Kiyonori Ugajin, Tokyo (JP); Masato Hayashi, Tokyo (JP)

(73) Assignee: SUMITOMO MITSUI BANKING CORPORATION, Tokyo (JP)

( * ) Notice: Subject to any disclaimer, the term of this patent is extended or adjusted under 35 U.S.C. 154(b) by 0 days.

(21) Appl. No.: 15/563,082

(22) PCT Filed: Mar. 31, 2015

(86) PCT No.: PCT/JP2015/001873
§ 371 (c)(1),
(2) Date: Sep. 29, 2017

(87) PCT Pub. No.: WO2016/157253
PCT Pub. Date: Oct. 6, 2016

(65) Prior Publication Data
US 2018/0089445 A1 Mar. 29, 2018

(51) Int. Cl.
*H04L 29/06* (2006.01)
*G06F 21/60* (2013.01)
(Continued)

(52) U.S. Cl.
CPC ............ *G06F 21/604* (2013.01); *G06F 21/31* (2013.01); *G06Q 40/025* (2013.01);
(Continued)

(58) Field of Classification Search
CPC .................................................. G06F 21/604
(Continued)

(56) References Cited

U.S. PATENT DOCUMENTS

| | | |
|---|---|---|
| 2001/0018674 A1 | 8/2001 | Schein et al. |
| 2012/0240194 A1* | 9/2012 | Nack Ngue ............ G06F 21/604 726/4 |
| 2013/0198857 A1* | 8/2013 | Maier ............... G06F 17/30566 726/27 |

FOREIGN PATENT DOCUMENTS

| | | |
|---|---|---|
| JP | 2002312581 | 10/2002 |
| JP | 2005-056105 | * 3/2005 |
| JP | 2005056105 | 3/2005 |

OTHER PUBLICATIONS

PCT International Report on Patentability dated Oct. 12, 2017 for corresponding International Application No. PCT/JP2015/001873, 12 pages.
(Continued)

*Primary Examiner* — Longbit Chai
(74) *Attorney, Agent, or Firm* — Lee & Hayes, P.C.

(57) ABSTRACT

It is very useful for a bank having offices in a plurality of countries to construct a system that enables bank employees in the offices to share information possessed by the offices. None of conventional systems available to the bank employees in all the offices allow appropriate access control to be performed while complying with laws and regulations that vary among the countries, thus enabling appropriate information to be disclosed to appropriate persons. A system, a method, and a program are provided that allow bank employees in a plurality of countries to access shared information in accordance with the roles & responsibilities of the bank employees while complying with laws and regulations in each country.

10 Claims, 19 Drawing Sheets

400

| USER ID | BELONGING ENTITY GROUP ID | BELONGING ENTITY ID | ROLES & RESPONSIBILITIES |
|---|---|---|---|
| U0001 | OG001 | OG001-003 | F |
| U0002 | OG001 | OG001-004 | Ex |
| U0003 | OG001 | OG001-002 | B |
| U0004 | OG001 | OG001-004 | F |
| U0005 | OG001 | OG001-004 | F |
| U0006 | OG002 | OG002-001 | FM |
| U0007 | OG003 | OG003-001 | F |

(51) Int. Cl.
  *G06F 21/31* (2013.01)
  *G06Q 40/02* (2012.01)
  *H04W 12/08* (2009.01)

(52) U.S. Cl.
  CPC .......... *H04L 63/102* (2013.01); *H04L 63/104* (2013.01); *H04W 12/08* (2013.01)

(58) Field of Classification Search
  USPC .......................................................... 726/2
  See application file for complete search history.

(56) References Cited

OTHER PUBLICATIONS

JP Decision to Grant a Patent for corresponding JP Patent Application No. 2016-516112 dated Apr. 21, 2016, 6 pages.

* cited by examiner

| USER ID | BELONGING ENTITY GROUP ID | BELONGING ENTITY ID | ROLES & RESPONSIBILITIES |
|---|---|---|---|
| U0001 | OG001 | OG001-003 | F |
| U0002 | OG001 | OG001-004 | Ex |
| U0003 | OG001 | OG001-002 | B |
| U0004 | OG001 | OG001-004 | F |
| U0005 | OG001 | OG001-004 | F |
| U0006 | OG002 | OG002-001 | FM |
| U0007 | OG003 | OG003-001 | F |

FIG.4

| ENTITY NAME | ENTITY ID | BELONGING ENTITY GROUP ID | COUNTRY WHERE ENTITY IS LOCATED |
|---|---|---|---|
| ... | OG001-001 | OG001 | FIRST COUNTRY |
| ... | OG001-002 | OG001 | FIRST COUNTRY |
| ... | OG001-003 | OG001 | SECOND COUNTRY |
| ... | OG001-004 | OG001 | THIRD COUNTRY |
| ... | OG002-002 | OG002 | SECOND COUNTRY |

FIG.5

| CLIENT ID | RESPONSIBLE OFFICE ENTITY ID | INFORMATION TYPE | INFORMATION ITEM ID | INFORMATION TYPE DETAILS | INFORMATION | CLIENT CONSENT |
|---|---|---|---|---|---|---|
| C0001 | OG001-002 | BASIC INFORMATION | B0001 | NAME, COUNTRY | XCorp | PROVIDED |
| | | | B0002 | BASIC ATTRIBUTE, RATING | Mr. X | NOT PROVIDED |
| | | | B0003 | SENSITIVE INFORMATION | | NOT PROVIDED |
| | | TRANSACTION COUNT | T0001 | OUTSTANDING DEPOSIT AND OUTSTANDING LOAN, REVENUES | 3,000,000 USD | PROVIDED |
| | | | T0002 | CREDIT PRESERVATION STATUS | http://xxxxx... | PROVIDED |
| | | | T0003 | CREDIT | : | PROVIDED |
| | | BUSINESS INFORMATION | S0001 | CREDIT APPLICATION, MONITORING CREDIT APPLICATION | : | PROVIDED |
| | | | S0002 | CONTRACT-RELATED DOCUMENTS, VARIOUS DOCUMENTS | : | PROVIDED |
| | | | S0003 | IMPORTANT INFORMATION, CORPORATE RELATION INFORMATION, AND THE LIKE | : | PROVIDED |

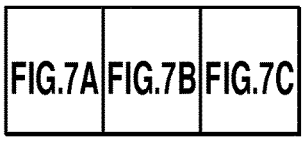

| RELATED PERSON INFORMATION MANAGING OFFICE | | | |
|---|---|---|---|
| ROLE OF RELATED PERSON | | | |
| ACCESS CONTROL TARGET INFORMATION | INFORMATION TYPE | INFORMATION ITEM ID | INFORMATION TYPE DETAILS |
| | BASIC INFORMATION | B0001 | NAME, COUNTRY, ADMINISTRATIVE INFORMATION |
| | | B0002 | SERVICE TYPE, FINANCIAL INFORMATION, IN-HOUSE RATING, CORPORATE INFORMATION, PROJECT INFORMATION, EXTERNAL RATING |
| | | B0003 | UNPOPULARITY INFORMATION, BUSINESS RELATION INFORMATION |
| | TRANSACTION COUNT | T0001 | OUTSTANDING DEPOSIT AND OUTSTANDING LOAN STATUS, CREDIT PRESERVATION STATUS, PROSPECT OF PROFIT |
| | BUSINESS INFORMATION | S0001 | INFORMATION FOR CREDIT APPLICATION |
| | | S0002 | CONTRACT-RELATED DOCUMENTS |
| | | S0003 | INSIDER INFORMATION |

FIG.7A

| SAME ENTITY GROUP AS THAT FOR INSPECTOR ||||||||||
|---|---|---|---|---|---|---|---|---|---|
| OUR OWN OFFICE ||||| ANOTHER ENTITY MANAGED OFFICE |||||
| BORROWER | VIRTUALLY SAME BORROWER | AFFILIATE | RELATED PARTY | OTHERS | BORROWER | VIRTUALLY SAME BORROWER | AFFILIATE | RELATED PARTY | OTHERS |
| F MB B | F MB B | F MB B | F MB B | F MB B | F MB B | F MB B | F MB B | F MB B | F MB B |
| F MB B | F MB B | F MB B | F MB B | F MB B | F MB B | F MB B | F MB B | F MB B | (F) - - |
| F - - | F - - | F - - | F - - | F - - | F - - | - - - | - - - | - - - | - - - |
| F - - | F - - | F - - | F - - | F - - | F - - | F - - | F - - | F - - | (F) - - |
| F - - | F - - | F - - | F - - | F - - | - - - | - - - | - - - | - - - | - - - |
| F MB B | F MB B | F MB B | F MB B | F MB B | - - - | - - - | - - - | - - - | - - - |
| INDIVIDUAL | INDIVIDUAL | INDIVIDUAL | INDIVIDUAL | INDIVIDUAL | INDIVIDUAL | INDIVIDUAL | INDIVIDUAL | INDIVIDUAL | INDIVIDUAL |

FIG.7B

| ENTITY GROUP DIFFERENT FROM ENTITY GROUP FOR INSPECTOR | | | | |
|---|---|---|---|---|
| (ANOTHER ENTITY MANAGED OFFICE) | | | | |
| BORROWER | VIRTUALLY SAME BORROWER | AFFILIATE | RELATED PARTY | OTHERS |
| F MB B | F MB B | F MB B | F MB B | F MB B |
| F MB B | F - - | - - - | F - - | - - - |
| F - - | - - - | - - - | - - - | - - - |
| F - - | F - - | F - - | F - - | - - - |
| - - - | - - - | - - - | - - - | - - - |
| - - - | - - - | - - - | - - - | - - - |
| INDIVIDUAL | INDIVIDUAL | INDIVIDUAL | INDIVIDUAL | INDIVIDUAL |

FIG.7C

| | TYPE OF LAWS AND REGULATIONS | RANGE OF INFORMATION SHARING | |
|---|---|---|---|
| | | CLIENT CONSENT PROVIDED | NO CLIENT CONSENT |
| 1 | "DIFFERENT CORPORATIONS IN DIFFERENT COUNTRIES" PATTERN | SHARABLE REGARDLESS OF CORPORATIONS OR COUNTRIES | SHARABLE WITHIN SAME CORPORATION AND WITHIN COUNTRY WHERE ENTITY IS LOCATED |
| 2 | "INFORMATION SHARABLE WITHIN SAME CORPORATION" PATTERN | SHARABLE REGARDLESS OF CORPORATIONS OR COUNTRIES | SHARABLE WITHIN SAME CORPORATION |
| 3 | "NO REGULATIONS FOR INFORMATION SHARING" PATTERN | SHARABLE REGARDLESS OF CORPORATIONS OR COUNTRIES | SHARABLE REGARDLESS OF CORPORATIONS OR COUNTRIES |

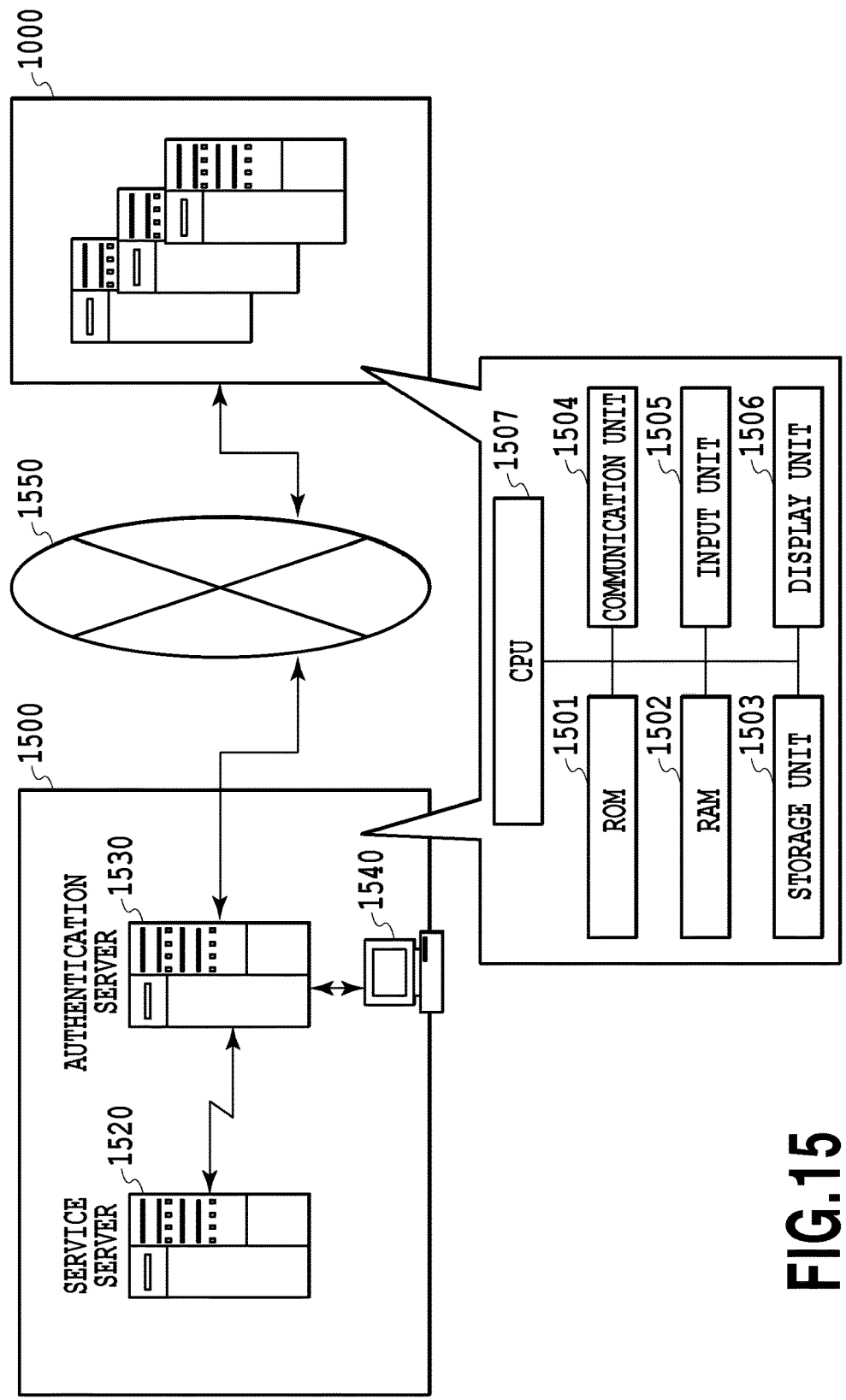

ACCESS CONTROL METHOD, SYSTEM AND STORAGE MEDIUM

TECHNICAL FIELD

The present invention relates to access control. More specifically, the present invention relates to providing access control in accordance with roles & responsibilities of bank employees in offices of a bank located in a plurality of countries while complying with laws and regulations that vary among the countries in a case where the bank employees share information.

BACKGROUND ART

In recent years, many corporations have expanded business overseas as a result of economic globalization. Each bank has offices in Asia, Oceania, United States, Europe, and the like in order to support corporations expanding business overseas.

The forms of bank financing include corporate finance in which a particular corporation is financed and project finance in which a cash flow of a particular project is analyzed to predict revenues so as to provide financing using an asset value of the project as collateral. In particular, for project finance in which not only domestic corporations but also a plurality of overseas corporations are involved, a bank needs to make credit decisions by verifying credit risks of borrowers, sponsors (corporations that sponsor a specific purpose company for the project), off-takers (corporations that purchase products resulting from the project), and the like (hereinafter collectively referred to as "related parties"). For credit decisions for financing for a global corporation with operations in plurality of countries, bank employees in a plurality of offices within a bank need to share information.

However, laws and regulations for handling of customer information vary among countries. Each overseas branch needs to manage customer information while complying with the laws and regulations of that country. Thus, much of the information handled is managed on a branch-by-branch basis, and information sharing among branches may be insufficient. For example, for the credit decisions as described above, comprehensive decisions need to be made based on a client's management, the contents of the client's business, the client's financial situation, and the client's credit situation. However, in some cases, information sharing among offices located in a plurality of countries may be insufficient.

Moreover, banks are corporations with a very high public nature and are desired to adhere not only to laws and regulations but also to social norms and business ethics. In particular, for megabanks, special attention is desired to be paid to compliances, and improving an effective compliance organizational structure is essential. For example, in Japan, in terms of internal control and protection of personal information, much attention is desired to be paid to handling of highly confidential documents inside banks. In particular, megabanks with operations in a plurality of countries are desired to give more attention due to variations, among the countries, in the contents and criteria of laws to be observed.

Moreover, various types of information are handled by banks, and thus, attention needs to be paid to access to insider information. For example, if M&A information is accessible before being publicly available, insider trading may be attempted. Shared information needs to be partitioned into parts so that each part can be set to be public/private.

It is very useful for a bank having offices in a plurality of countries to construct a system that enables bank employees in the offices to share information possessed by the offices. None of conventional systems available to the bank employees in all the offices allow appropriate access control to be performed while complying with laws and regulations that vary among the countries, thus enabling appropriate information to be disclosed to appropriate persons.

Thus, an object of the present invention is to allow bank employees in offices of a bank with operations in a plurality of countries to share information and to prevent an unauthorized bank employee to access the shared information without violating laws and regulations in the countries.

SUMMARY OF INVENTION

To accomplish such an object, the present invention provides a control method for access to information, the method being executed by a global credit management system and having a step of receiving a login ID of a user, a step of determining a roles & responsibilities associated with the login ID and an entity to which the user belongs, and a step of determining accessibility of information that the user attempts to access, wherein determining the accessibility is executed based on a) a step of determining an entity managing the information that the user attempts to access, b) a step of determining an access control pattern based on laws and regulations associated with the entity managing the information that the user attempts to access, c) a step of determining whether the access control pattern based on the laws and regulations is satisfied based on a relation between the entity to which the user belongs and the entity managing the information that the user attempts to access, and d) a step of determining whether information that the user attempts to access is accessible with the roles & responsibilities associated with the login ID.

According to the present invention, employees in a plurality of countries can access shared information in accordance with the roles & responsibilities of the employees while complying with the laws and regulations in the countries.

BRIEF DESCRIPTION OF DRAWINGS

FIG. 4 illustrates an example of a data structure of user information registered in a user information linkage database according to an embodiment of the present invention;

FIG. 5 illustrates an example of a data structure of entity information registered in the user information linkage database (or any other database) according to an embodiment of the present invention;

FIG. 6 illustrates an example of a data structure of customer information registered in a customer information management database according to an embodiment of the present invention;

FIG. 7 is a diagram illustrating relations between FIG. 7A, FIG. 7B and FIG. 7C;

FIG. 7A illustrates an example of a data structure of an access authority table for each type of customer information registered in the customer information management database or any other database according to an embodiment of the present invention;

FIG. 7B illustrates an example of the data structure of the access authority table for each type of customer information registered in the customer information management database or any other database according to an embodiment of the present invention;

FIG. 7C illustrates an example of the data structure of the access authority table for each type of customer information registered in the customer information management database or any other database according to an embodiment of the present invention;

FIG. 8 illustrates an example of a data structure of type information on laws and regulations regarding customer information registered in the customer information management database or any other database according to an embodiment of the present invention;

FIG. 13 is a diagram illustrating a relation between FIG. 13A and FIG. 13B;

FIG. 15 illustrates an example of a configuration of a financial institution system and a global credit management system according to an embodiment of the present invention.

DESCRIPTION OF EMBODIMENTS

Embodiments of the present invention will be described below in detail with reference to the drawings.

In the present specification, an entity group refers to a group (for example, an incorporated company) belonging to an organization of one bank. That is, each entity group refers to, for example, a bank incorporated in Japan or another corporation affiliated with the bank (for example, a local corporation). For a bank incorporated in Japan, a plurality of subsidiaries incorporated overseas exist which is managed and operated independently of the bank incorporated in Japan. In application of laws and regulations, even affiliated corporations are treated as separate corporations. Thus, each corporation needs to use different access control. Thus, the present invention enables a plurality of entity groups to be identified and enables appropriate access control to be performed on each of the entity groups. Furthermore, in the present specification, the entity refers to a business office (a branch or a local office) belonging to an entity group.

Figure 1:
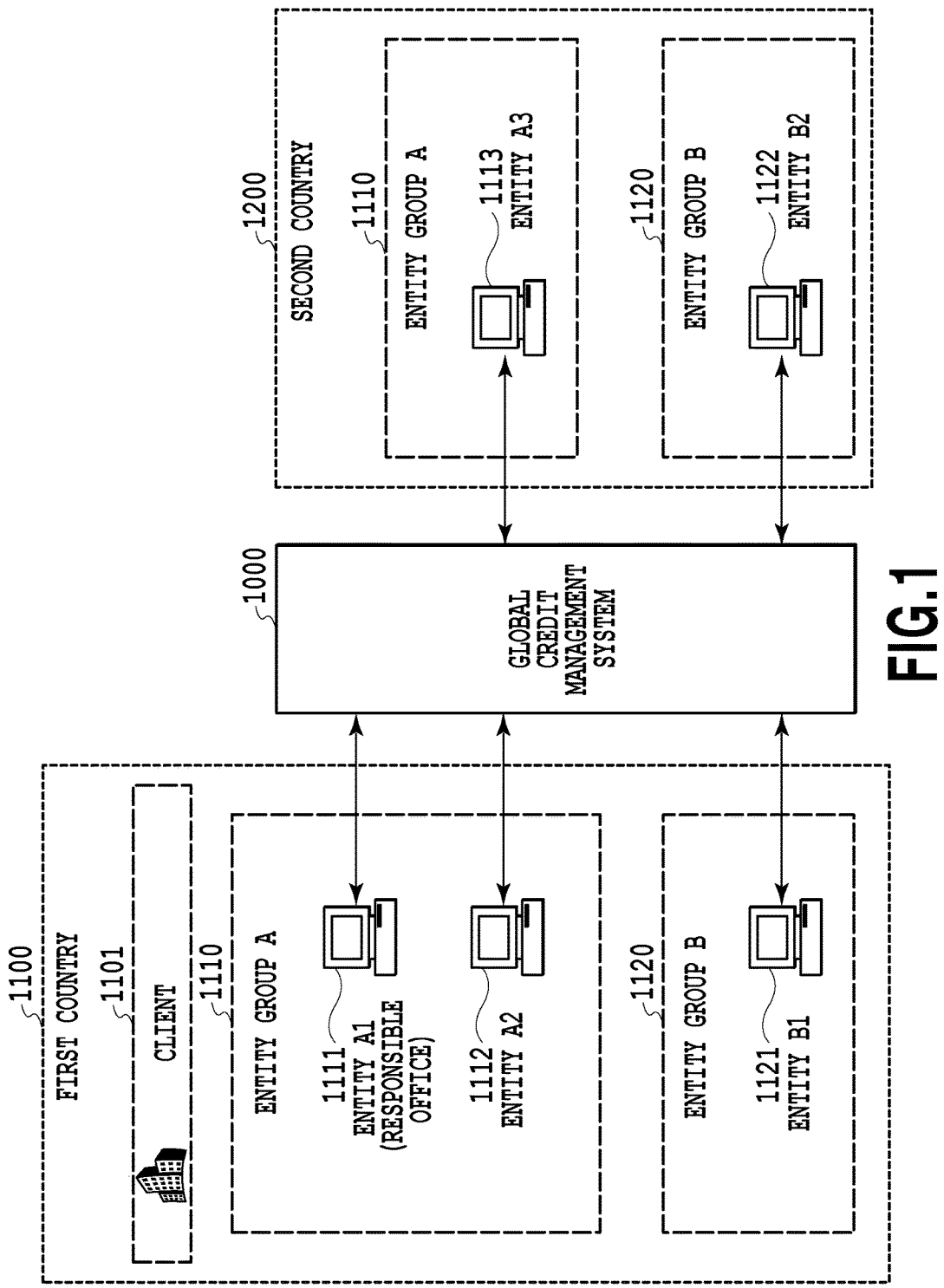
FIG. 1 is a diagram conceptually illustrating a relation between a global credit management system and entities belonging to respective entity groups.

FIG. 1 is a diagram conceptually illustrating a relation between a global credit management system 1000 according to the present invention and entities belonging to respective entity groups.

A client 1101 is a corporation established in a first country 1100. In the first country 1100, an entity A1 1111 and an entity A2 1112 which belong to an entity group A 1110 exist. The entity A1 1111 is an entity that is consulted about financing by the client 1101 and that manages information on the client 1101 (the entity that manages clients' information is hereinafter referred to as a "responsible office"). In the present specification, "managing a client's information" represents taking responsibility mainly for creating and updating the client's information stored in a server placed in any place (that may be a country where the responsible office is located or a country other than the country where the responsible office is located). The responsible office need not necessarily have a server placed in the premises of the responsible office to store the client's information. Moreover, in the first country 1100, an entity B1 1121 belonging to an entity group B 1120 (the entity group B is a corporation that is affiliated with the entity group A but that is a different corporation from the entity group A) exists.

A second country 1200 is a country that is different from the first country 1100. In the second country 1200, an entity A3 1113 belonging to the entity group A 1110 exists. Moreover, in the second country 1200, an entity B2 1122 belonging to the entity group B 1120 exists.

In this manner, the present invention controls access to the same information from bank employees belonging to five types of entities. The five types of entities are a responsible office that manages the information (that is, the entity A1 1111), another entity that exists in the same country where the responsible office exists and that belongs to the same entity group to which the responsible office belongs (that is, the entity A2 1112), an entity that belongs to an entity group different from the entity group to which the responsible office belongs but that exists in the same country where the responsible office exists (that is, the entity B1 1121), an entity that belongs to the same entity group to which the responsible office belongs but that exists in a country different from the country where the responsible office exists (that is, the entity A3 1113), and an entity that belongs to an entity group different from the entity group to which the responsible office belongs and that exists in a country different from the country where the responsible office exists (that is, the entity B2 1122).

Figure 2:
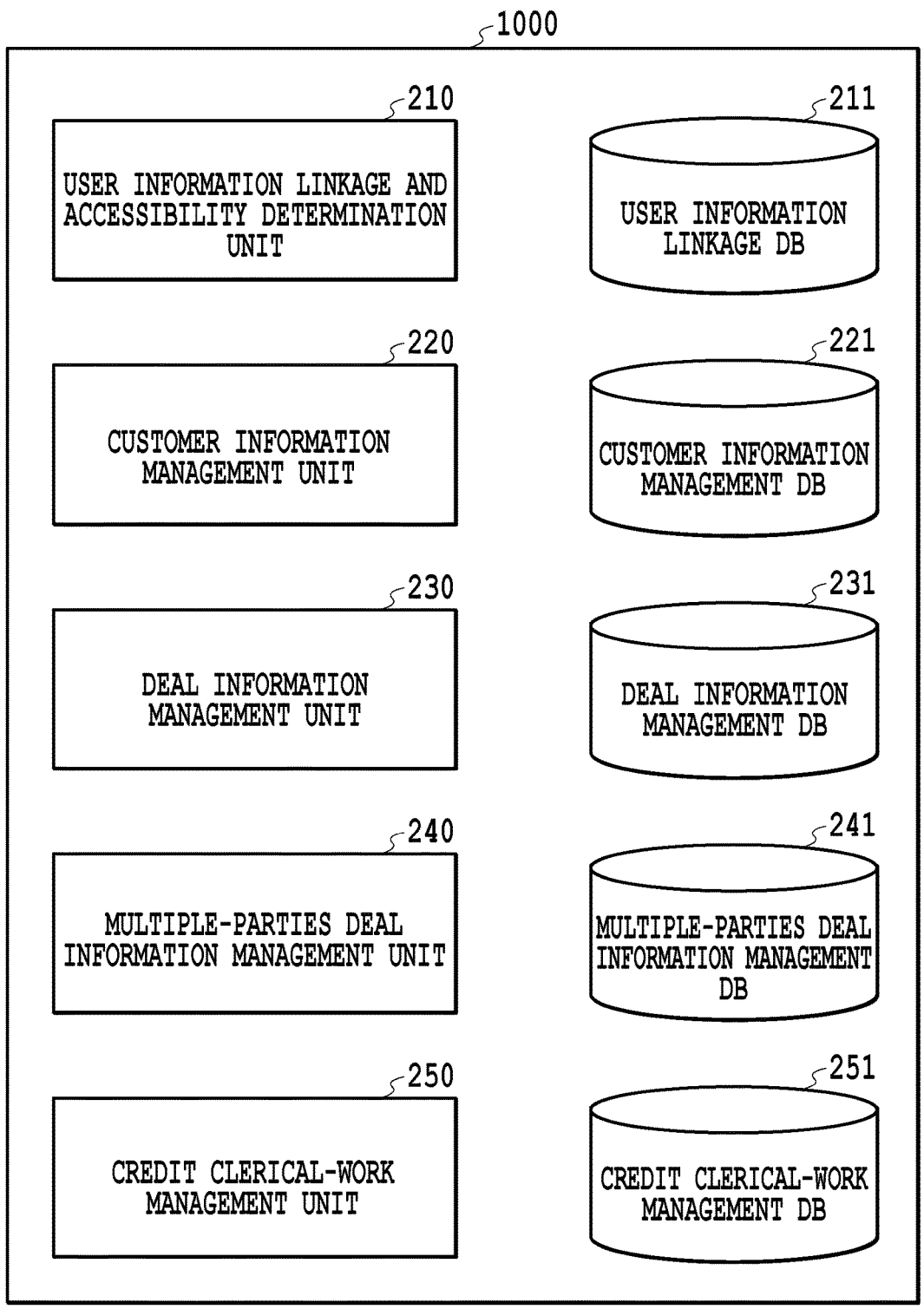
FIG. 2 is a function block diagram of the global credit management system according to an embodiment of the present invention.

FIG. 2 is a function block diagram of the global credit management system. 1000 according to an embodiment of the present invention.

The global credit management system 1000 is a system that is linked with a bank system 1500 (described below with reference to FIG. 15) that varies among the entities or the entity groups (or that is common to the entities or the entity groups) to perform global credit management. The global credit management system 1000 has a user information linkage and accessibility determination unit 210, a customer information management unit 220, a deal information management unit 230, and a multiple-parties deal information management unit 240, and a credit clerical-work management unit 250. The global credit management system 1000 is a computer including a processor and a memory. Furthermore, the global credit management system 1000 includes a storage medium that stores a program that operates the user information linkage and accessibility determination unit 210, the customer information management unit 220, the deal information management unit 230, the multiple-parties deal information management unit 240, and the credit clerical-work management unit 250 or a program that allows a process flow described below to be executed.

The user information linkage and accessibility determination unit 210 serves to tie information on a user having logged into the bank system 1500 to information on the user managed in the global credit management system 1000. The present invention divides bank employees belonging to entities in the world based on globally standardized "roles & responsibilities" and provides access control in accordance with the bank employees' roles & responsibilities. For example, the roles & responsibilities include types such as a front, a front middle, a middle back, a back, and a credit department, though these types are illustrative and should not be restrictively interpreted. The bank employees with the respective roles & responsibilities can each access information allowed to be accessed for the roles & responsibilities. The user information linkage and accessibility determination unit 210 can read a roles & responsibilities associated with a user ID used to log in to the bank system 1500 from user information 400 of a user information linkage database 211 (described below). Furthermore, based on the read roles & responsibilities, the global credit management system 1000 can determine whether or not the user ID is authorized to access the information (this will be described below in detail).

The customer information management unit 220 serves to prepare customer information needed in a credit management process using a form and a format that are common to offices. A failure to link offices with one another cause customer information to be created and updated based on rules that vary among the offices, leading to the lack of confidentiality, integrity, and availability. Credit services for global corporations and the like need business management across offices, and thus, a mechanism that manages customer information within a common framework is needed. Thus, the customer information management unit 220 manages all data on clients needed for credit decisions, using a global common format. The customer information management unit 220 may register and update corporation information acquired from external research agencies or customer information acquired from other systems. The customer information management unit 220 further stores and updates corporate information including basic information such as countries where the head offices of clients are located and business type information, monitoring information such as borrower rating, management information such as main stockholders and corporate histories, and business information such as main business partners. The customer information management unit 220 may also have a function to display summaries including only main items of corporate information and financial information and a function to display main financial information and information specific to business types of a competitor of the client in a comparable form. A summary of financial information enables characters for tying comments input by a person in charge or a credit officer to various account items to be registered in units of account items and supports identification of an account item for which a comment is intended. The customer information management unit 220 provides a function to register and display, for borrowings of corporations, outstanding borrowings at any reference date and time in units of lenders.

The above-listed information items are illustrative and should not be limited, but the customer information management unit 220 manages a variety of types of information on clients that is to be carefully handled. Thus, access control is desired to be implemented that enables only bank employees having the appropriate roles & responsibilities to inspect information while observing laws and regulations in each country. Upon receiving, from each office, a request to reference information needed for credit decisions, the customer information management unit 220 extracts data related to the reference request from a customer information management database 221 and provides the data.

For example, for finance decisions for project finance in which a plurality of related parties is present, a request to reference information not only on borrowers but also on stakeholders, guarantors, and the like is expected to be made. Upon receiving a request to reference customer information regarding stakeholders and guarantors involved in the project finance, the customer information management unit 220 extracts, in cooperation with the multiple-parties deal information management unit 240 described below, information from the customer information management database 221 and provides the information. In this case, different access restrictions may be assigned to respective stakeholders and guarantors. For example, for customer information on a stakeholder A, no roles & responsibilities-based access restriction is specified and persons with any roles & responsibilities are allowed to access the information. On the other hand, for customer information on a guarantor B, roles & responsibilities for which access is allowed are designated so that only persons with the designated roles & responsibilities are allowed to access the information.

Furthermore, the customer information management unit 220 may subdivide the information items to assign different access restrictions to the respective information items. For example, among the pieces of customer information, information on M&A being negotiated is subjected to the highest access restriction so that the information is disclosed only to persons with particular roles & responsibilities. On the other hand, for the basic customer information, a wide variety of types of roles & responsibilities are designated so that persons with a wide variety of roles & responsibilities are allowed to access the information. Moreover, the customer information may be subdivided so that a variety of access restrictions are associated with the respective pieces of information.

Upon receiving a reference request, the customer information management unit 220 can read, in extracting information from the customer information management database 221, "roles & responsibilities" needed to reference information regarding the request from the customer information management database 221 and provide the "roles & responsibilities" to the user information linkage and accessibility determination unit 210.

The deal information management unit 230 serves to manage information for each credit transaction (deal). A deal information management database 231 retains information on finance deals such as profiles (acceptance backgrounds, funding, support sharing, lending structures, and the like), credit specifications, maximum amounts, collateral specifications, and the like. For example, upon being consulted about financing for a certain project from a client, an entity registers information on the project in the deal information management database 231. Subsequently, in a case where, for example, a credit application is created, the credit application is approved, or financing is performed, risk decisions for the project and the like can be executed with reference to the deal information registered in the deal information management database 231. The deal information management unit 230 may have a function to provide information associated with the deal information in cooperation with the customer information management unit 220 and the multiple-parties deal information management unit 240.

The multiple-parties deal information management unit 240 manages information to verifies credit risks of related parties such as sponsors and off-takers in a structured finance deal or the like, and make credit decisions. For financing for a certain project, it is very important to verify credit risks of related parties such as sponsors and off-takers involved in the project in a case where credit decisions are made. However, different sponsors, off-takers, or the like may exist in the respective countries, and information on sponsors and off-takers may be managed by the respective offices. Therefore, information on sponsors and off-takers needs to be integrally retained and different types of access control need to be performed in accordance with offices (that is, responsible offices) managing the information. A multiple-parties deal information management database 241 stores summaries of projects, asset profiles such as structures and milestones, and information on related parties. For example, the multiple-parties deal information management unit 240 classifies parties involved in a credit transaction according to the roles of the parties for the project as depicted in the table below. The present system may be configured such that access control is performed based on the registered types of parties described below.

TABLE 1

| Registered types of related persons | |
|---|---|
| Borrowers | Borrowers |
| Persons substantially the same as the borrowers | Entities that are separate from the borrowers but for which deadlock of one business partner is likely to affect another particular party (investment ratio of more than 50%, substantial dominators, guarantors, and the like) |
| Affiliates | Persons that are not substantially the same as the borrowers but that correspond to affiliated companies, companies accounted for using the equity method, and the like. Parties expected to be needed for managing profits of a group. |
| Related parties | Sponsors, off-takers, and the like for a project finance. Not borrowers but counter parties of various contracts integrated with credit contracts. Parties based on the persons substantially the same as the borrowers and needing credit management. |
| Others | Parties not corresponding to the above-listed parties |

The credit clerical-work management unit 250 serves to efficiently manage and operate credit works in a bank within a global common framework.

Figures 3, 3A:
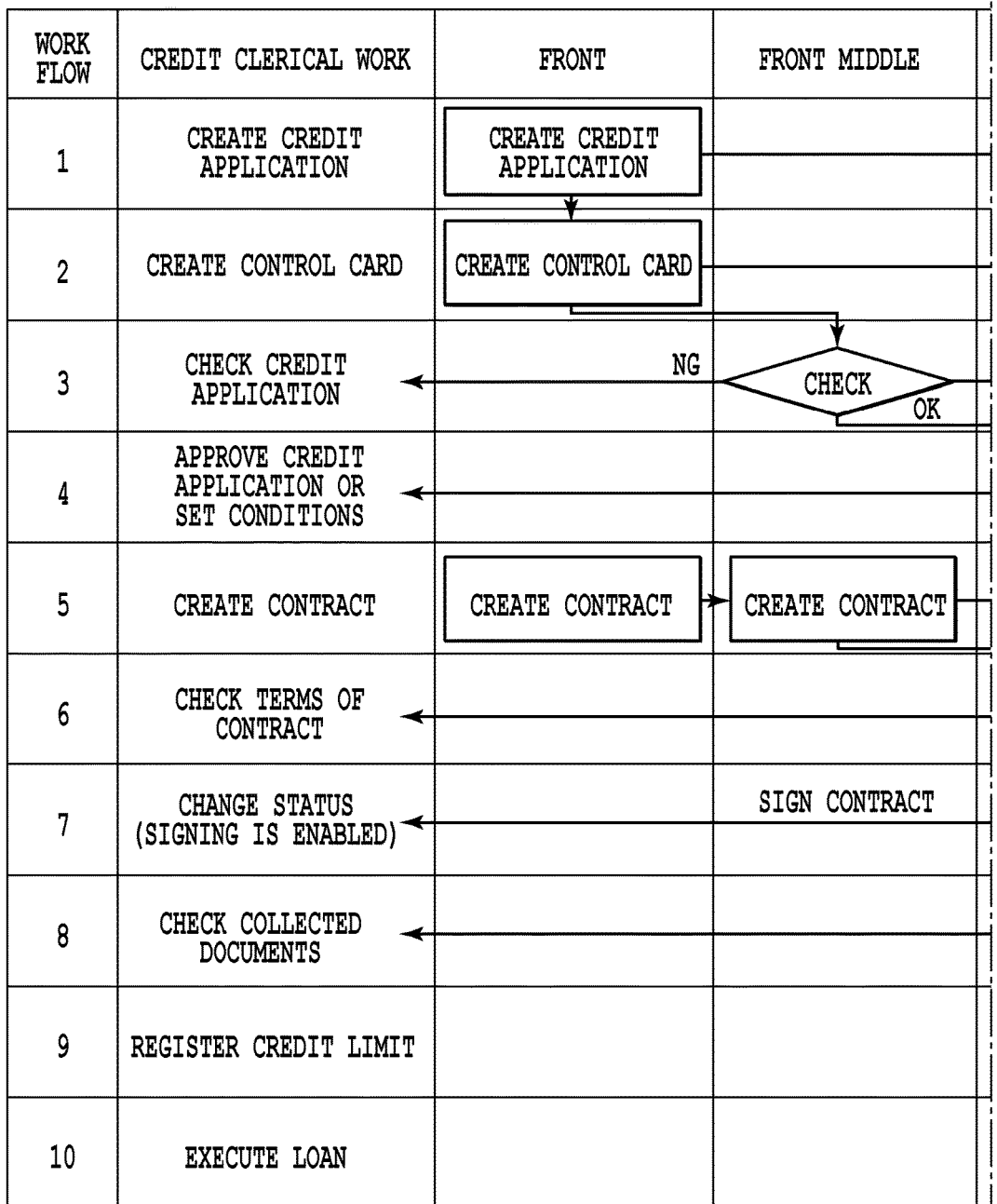
FIG. 3 is a diagram illustrating a relation between FIG. 3A and FIG. 3B.
FIG. 3A is a diagram illustrating a workflow for credit works inside a bank according to an embodiment of the present invention.
Figure 3B:
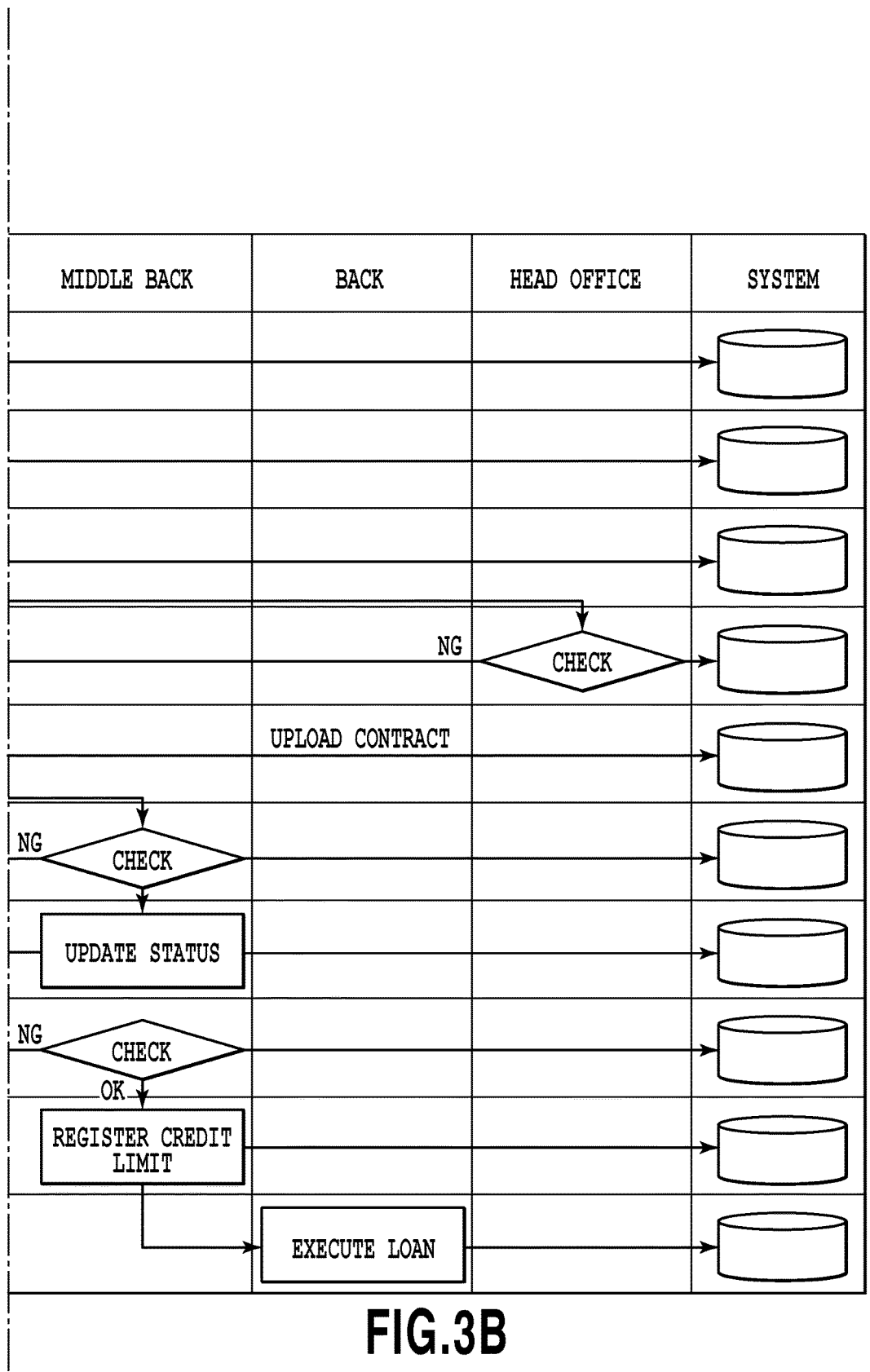
FIG. 3B is a diagram illustrating the workflow for the credit works inside the bank according to an embodiment of the present invention.

For example, FIGS. 3A and 3B is a diagram illustrating a workflow for credit works inside a financial institute. The front is an abbreviation of a "front office" and mainly, for example, keeps contact with a client to determine conditions for a financial transaction, (temporarily) makes a contract, and creates a credit application. The front middle mainly formally inspects the credit application for the (temporary) contract made between the client and the front, and checks needed documents, procedures, and the like for the contents. The middle back mainly performs routine check operations such as checks on the approved credit application and contract documents. The head office (credit department) approves the credit application or sets conditions. In a case where the credit application is approved, the front and the front middle create a contract, the middle back checks the created contract and registers a credit limit, and the back further executes a payment process based on the signed contract.

In this manner, works related to one credit service are subdivided into a number of works such that a plurality of departments are involved in the resultant works. The plurality of departments may exist in a plurality of countries and/or belong to a plurality of entity groups. The credit works in the bank are further complicated because the credit works are related to different offices, different departments, and/or a plurality of entity groups. Thus, the credit clerical-work management unit 250 provides a mechanism that clarifies role sharing for the offices and the departments and that allows the credit works to be performed within a common framework in a common format. A credit clerical-work management database 251 stores information needed for credit works in the global common format, and is accessed by each office in a case where each work step is executed. Standardization and visualization of credit work management in the global common format clearly indicate in which stage a certain credit service is and which department is responsible for the credit service. The credit clerical-work management unit 250 mainly roughly divides management into three steps, preparation prior to contract, preparation for execution, and control in credit period.

The credit clerical-work management database 251 stores information needed to execute the above-described three steps. For example, in the step of preparation prior to contract, information on inspection of the contents of the contract (inspection prior to signing), collected documents needed before signing (various documents), auxiliary processes, credit department conditions, provision of collateral and guarantees prior to signing, and the like is checked and stored in the credit clerical-work management database 251. In the step of preparation for execution, information on documents to be collected after signing (various documents), provision of collateral and guarantees after signing, and the like is checked and stored in the credit clerical-work management database 251. In the step of control in credit period, information on documents to be collected after signing in a state where accounting is executable, credit department conditions, provision of collateral and guarantees after signing in the state where accounting is executable, and the like is checked and stored in the credit clerical-work management database 251.

FIG. 4 illustrates an example of a data structure regarding the user information 400 registered in the user information linkage database 211 according to an embodiment of the present invention. The user information 400 includes a user ID indicative of a user's login ID and the user's belonging entity group ID, belonging entity ID, and roles & responsibilities. The "user ID" is a login ID used by a bank employee to log in to the bank system 1500. The "belonging entity group ID" is the ID of an entity group to which the entity to which the bank employee belongs belongs. The entity group ID is an ID that allows the entity group to be uniquely identified. The "belonging entity ID" is the ID of the entity to which the bank employee belongs. The entity ID is an ID that allows an entity (for example, a branch or a local office) belonging to a certain entity group to be uniquely identified. The "roles & responsibilities" is an ID that allows the type of the global common "roles & responsibilities" (the front (F), the front middle (FM), the middle back (MB), the back (B), or the like) to be identified. In order to link the global credit management system 1000 with the bank system 1500, which varies among the offices (or which is common to the offices), the user information 400 includes the information on the belonging entity group ID, the belonging entity ID, and the roles & responsibilities, which are associated with user ID of the bank system 1500.

FIG. 5 illustrates an example of a data structure regarding entity information 500 registered in the user information linkage database 211 (or any other database) according to an embodiment of the present invention. The entity information 500 includes, for the entities located around the world, entity names, entity IDs, belonging entity group IDs, and location countries. The "entity name" is a branch name, a local office name, or the like of the entity. The "entity ID" is the ID of the entity. The "belonging entity group ID" is the ID of the entity group to which the entity belongs. The "location country" is indicative of the country where the entity exists.

FIG. 6 illustrates an example of a data structure regarding customer information 600 registered in the customer information management database 221 according to an embodiment of the present invention. The customer information 600 includes information such as a client ID, the entity ID of an entity (that is, a responsible office) managing the customer information, an information type, an information item ID, information type details, information, and the presence or absence of client consent. The "client ID" is an ID that uniquely identifies a client. The "responsible office entity ID" is the entity ID of the entity managing the information on the client. The "information type" is the type of the customer information. The "information item ID", the "information type details", and the "information" are detailed classifications of each information type. The information type has been described taking three examples (basic information, transaction count, and business information) byway of example. However, of course, subdivided information types may be used. The "client consent" indicates whether or not the client consents disclosure of the information to the outside of the range of information sharing (for example, the information can be shared within the same corporation located at home or within the same corporation located at home and overseas) that is allowed by laws in the country where the responsible office exists.

FIGS. 7 A, 7B and 7C illustrates an example of a data structure regarding an access authority table 700 for each type of customer information registered in the customer information management database 221 or any other database according to an embodiment of the present invention. The access authority table 700 is referenced to determine roles & responsibilities allowed to access the customer information based on a relation between the belonging entity of an inspector (that is, a bank employee who logs in using the user ID to access the information) and the entity managing the customer information per the type of the customer information. In the access authority table 700, an "our own office" means that the entity to which the inspector belongs manages the client's information, and an "another-entity managed office" means that another entity belonging to the same entity group to which the inspector belongs manages the client's information. For example, for information on the client name and the client's country included in the basic information, a bank employee belonging to the entity managing the client's information is allowed to inspect the information in a case where the roles & responsibilities of the bank employee is F (front), MB (middle back), or back (B). Moreover, different access authorities may be granted depending on the role of the client in the project. For example, clients involved in structured finance may be identified using registered types of related persons that are classified as borrowers, persons substantially the same as the borrowers, affiliates, related parties, and others, and different types of access control may be performed depending on the role of the client in the project.

FIG. 8 illustrates an example of a data structure regarding type information 800 for laws and regulations in each country regarding the customer information, which is registered in the customer information management database 221 or any other database, according to an embodiment of the present invention. In the present embodiment, the laws and regulations in each country are classified into three types byway of example. For example, for a type 1, even in a case where an entity to which a user requesting access (that is, a bank employee who inspects information) belongs and an entity managing the customer information belong to the same entity group (for example, the same corporation), the client's consent is needed in order to allow the entities to share the information in a case where the entities are located in different countries. For a type 2, even in a case where the entity to which the user requesting access belongs and the entity managing the customer information are located in different countries, the entities located in the different countries can share the information (without the client's consent) in a case where the entities belong to the same entity group. For a type 3, even in a case where there are no laws or regulations for information sharing and the entity to which the user requesting access belongs and the entity managing the customer information do not belong to the same entity group and are located in different countries, the entities are allowed to share the information. Furthermore, for each of the types, the names of countries that adopt the laws and regulations of that type are registered (not depicted in the drawings). Furthermore, for each type, the laws and regulations in the country where the responsible office for the inspected customer information is located are applicable.

Figure 9:
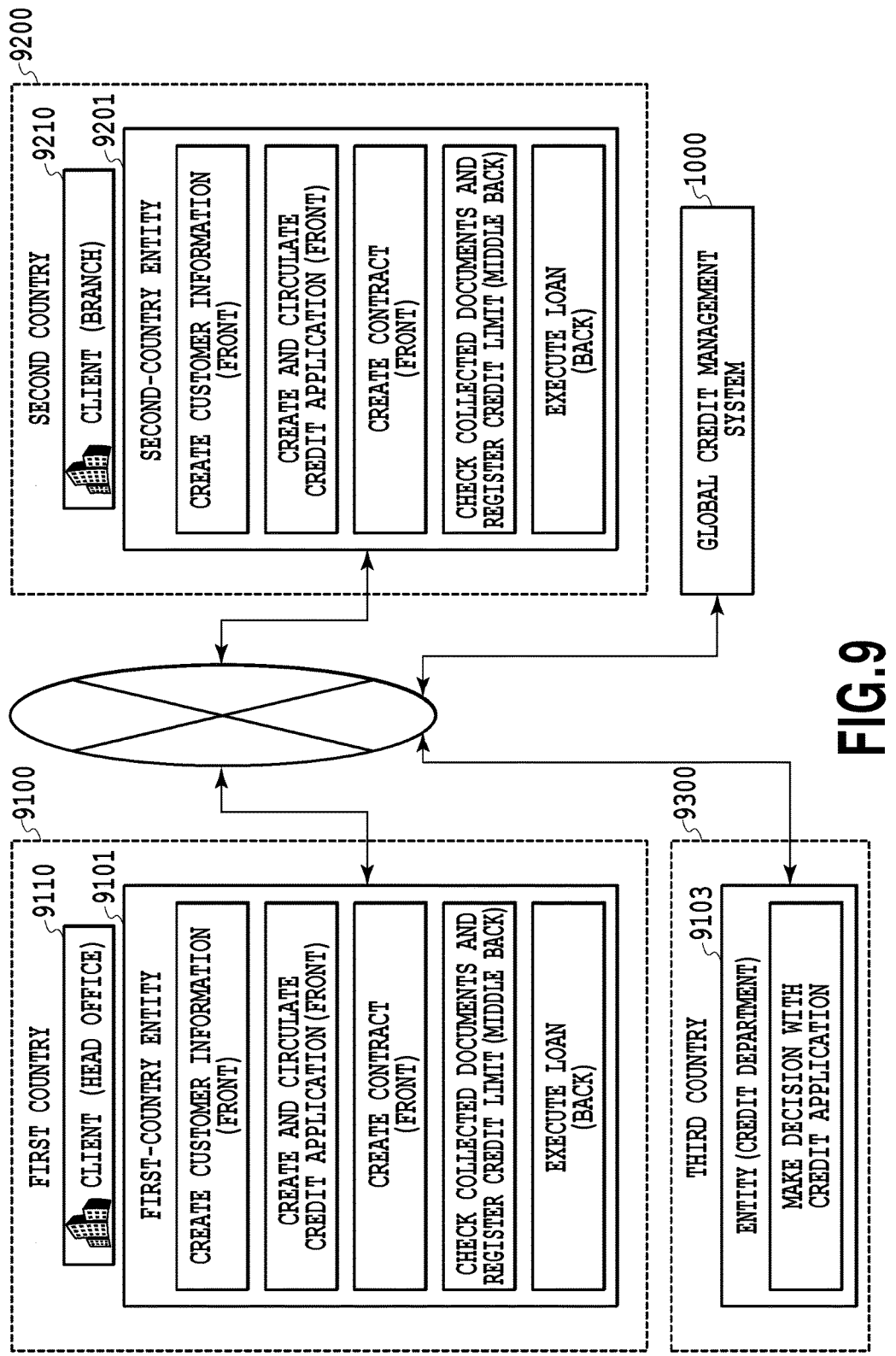
FIG. 9 is a diagram illustrating a whole picture of an exemplary embodiment for a first type of laws and regulations in each country according to an embodiment of the present invention.

FIG. 9 is a diagram illustrating a whole picture of an exemplary embodiment for the first type of laws and regulations according to an embodiment of the present invention. The present embodiment will be described taking, as an example, execution of financing for a client (business company X) having a head office located in a first country 9100 and a branch located in a second country 9200. The business company X desires to have financing executed in the first country 9100 where the head office 9110 is located and in the second country 9200 where the branch 9210 is located. Therefore, the client (head office) 9110 consults the first-country entity 9101 located in the first country about the financing. Furthermore, the client (branch) 9210 consults the second-country entity 9201 located in the second country (the second-country entity 9201 belongs to the same entity group to which the first-county entity 9101 belongs) about the financing. The customer information on the business company X is assumed to be managed by the first-country entity 9101 located in the first country (that is, the first-country entity 9101 is a responsible office). In other words, the first-country entity 9101 creates or updates the customer information on the business company X, creates deal information and a credit application, and executes procedures for risk registration and the like. The second-country entity 9201 references the customer information on the business company X, the deal information, and the credit application created or updated by the first-country entity 9101.

In the first-country entity 9101 and the second-country entity 9201, works corresponding to the roles & responsibilities are generated in accordance with a workflow in FIGS. 3A and 3B. A person having the role of the front creates the client's customer information and a credit application, and in an entity (credit department) 9103 located in a third country 9300, a decision is made based on the credit application. Subsequently, in the first-country entity 9101 and the second-country entity 9201, the front creates a contract, and the middle back checks collected documents and registers a credit limit. In a case where all the procedures are smoothly executed, the back finally performs a lending execution process. At this time, persons having authorities corresponding to their roles & responsibilities need to reference the deal information and the customer information on the business company X in accomplishing the assigned roles & responsibilities. The customer information on the business company X is managed by the first-country entity 9101, and thus needs to be subjected to access control in accordance with the laws and regulations (e.g. type 1) in the first-country entity 9101 where the responsible office exists. For example, this will be described with reference to the following figure taking, as an example, access control for a user belonging to the second-country entity 9201 and having the roles & responsibilities of the front.

Figure 10:
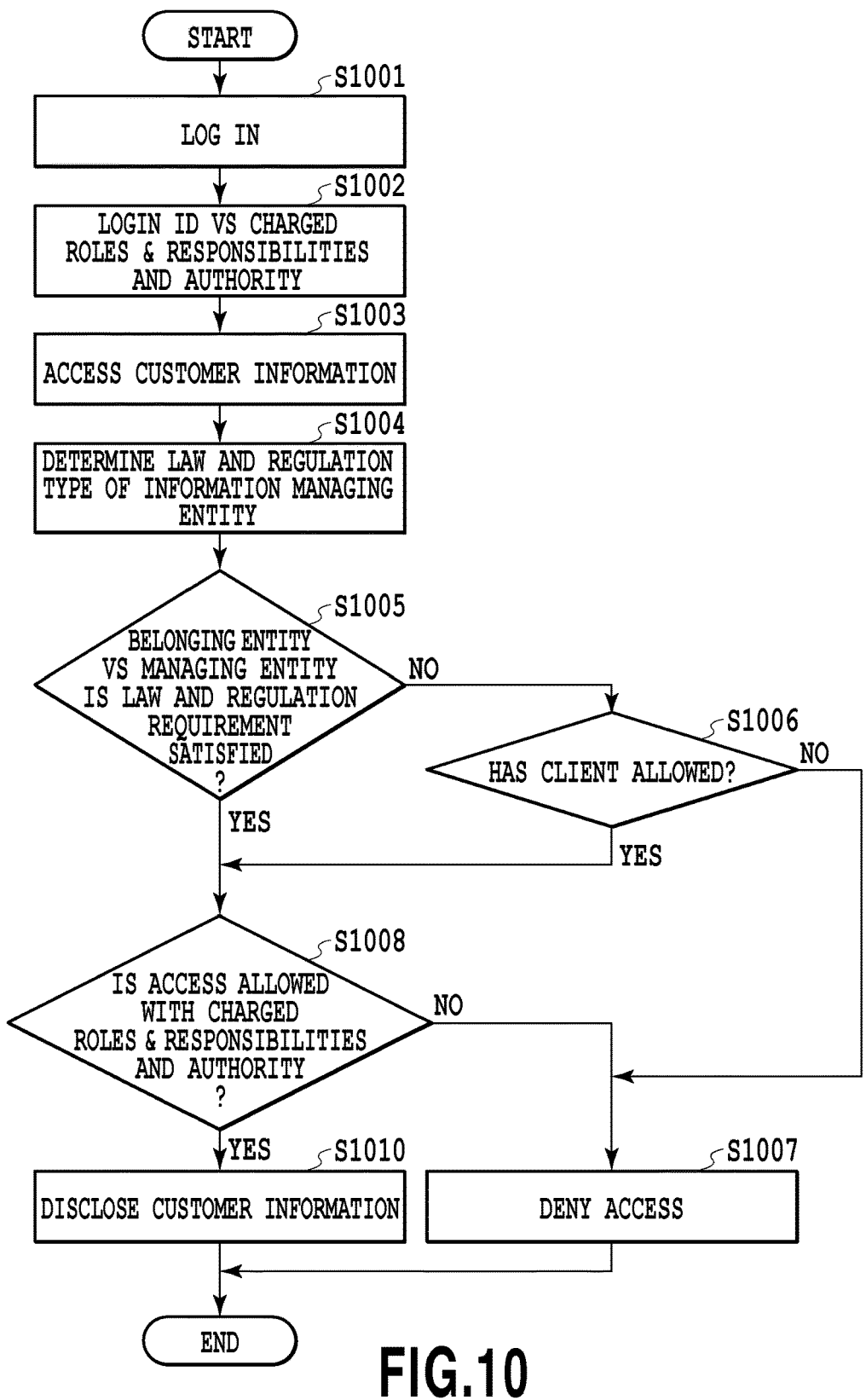
FIG. 10 is a flowchart illustrating a flow of a process executed in a system related to the present invention, according to an embodiment of the present invention.

FIG. 10 is a flowchart illustrating a flow of a process executed in a system related to the present invention according to an embodiment of the present invention. As described above, based on the case in FIG. 9, description will be given taking, as an example, access control in which a user (user ID: U0001) who belongs to the second-country entity 9201 located in the second country and who has the roles & responsibilities of the front accesses the customer information managed by the first-country entity 9101 located in the first country.

In step 1001, the user logs in to the bank system 1500 of the entity group to which the user belongs. For example, the bank system 1500 to which the user logs in may be a system common to all the entity groups or one of separate systems for the respective countries or entity groups in a case where the bank system 1500 is linked with the global credit management system 1000.

In step 1002, the user information linkage and accessibility determination unit 210 references the user information 400 to determine the roles & responsibilities, the belonging entity ID, and the belonging entity group ID corresponding to the user ID used for the login. In the present example, based on the user information 400, the user (user ID: U0001) is determined to be responsible for the roles & responsibilities of the front and to belong to an entity ID: OG0001-0003 belonging to an entity group ID: OG001.

In step 1003, the user (user ID: U0001) accesses the customer information (in the present example, the information on the business company X) in order to determine credit conditions and the like and to create a credit application. In the present step, the user information linkage and accessibility determination unit 210 references the customer information 600 to determine the entity managing the customer information requested to be accessed. In the present example, the user information linkage and accessibility determination unit 210 references the customer information 600 to determine that the entity ID: OG001-002 is an entity managing the customer information. Moreover, in the present step, the user information linkage and accessibility determination unit 210 references the customer information 600 to determine the information type and information item ID of the customer information requested to be accessed. In the present step and the following steps, instead of the configuration in which the user information linkage and accessibility determination unit 210 references the customer information 600 and the like, a configuration may be adopted in which a request is submitted to the customer information management unit 220, which then references the customer information 600 and the like.

In step 1004, the user information linkage and accessibility determination unit 210 references type information 800 for laws and regulations in each country and the entity information 500 to determine the law and regulation type of the country where the entity managing the customer information is located. In the present example, the type of the laws and regulations for the entity managing the customer information requested to be accessed is assumed to be 1.

In step 1005, the user information linkage and accessibility determination unit 210 determines whether requirements for the laws and regulations in the country are satisfied based on the relation between the entity to which the user (user ID: U0001) attempting to access the information belongs and the entity managing the customer information. In the present example, the type of the laws and regulations determined in step 1004 requires that the entity to which the login user belongs (i) belongs to the same entity group to which the entity managing the customer information belongs and (ii) is located in the same country where the entity managing the customer information is located. The second-country entity 9201 to which the user (user ID: U0001) belongs belongs to the same entity group to which the first-country entity 9101 managing the customer information belongs (the above-described (i) condition is satisfied), but on the other hand, does not belong to the country to which the first-country entity 9101 managing the customer information is located (the above-described (ii) condition is not satisfied). Therefore, the process branches to NO and shifts to step 1006.

In step 1006, the user information linkage and accessibility determination unit 210 determines whether consent for disclosure of the customer information on the business company X has been provided by the business company X. For the client consent, the client may be pre-asked for confirmation in a case where the customer information is collected so that the presence or absence of consent may be stored in the customer information 600. The client consent may of course be comprehensive consent for all of the customer information on the client or consent for each information type or each information item. In a case where no consent has been provided, access denial is determined in step 1007, and the process is ended.

In step 1008, the user information linkage and accessibility determination unit 210 references the access authority table 700 for each type of customer information to determine whether or not the customer information is accessible with the roles & responsibilities associated with the login ID of the user. In the present example, the second-country entity 9201 to which the user (user ID: U0001) attempting to access the information belongs to the same entity group to which the first-country entity 9101 managing the customer information belongs. For example, the information type that the user attempts to access is assumed to be the basic information (information item ID: B0003), and the business company X is a business partner managed by an entity (another-entity managed office) different from the second-country entity 9201. The user information linkage and accessibility determination unit 210 references the access authority table 700 to determine that access from the user (user ID: U0001) having the roles & responsibilities of the front is allowed (in a case where the related person has the role of a "borrower").

In step 1009, in a case where the access is determined to be allowed in step 1008, the customer information is disclosed and the process is ended.

Figure 11:
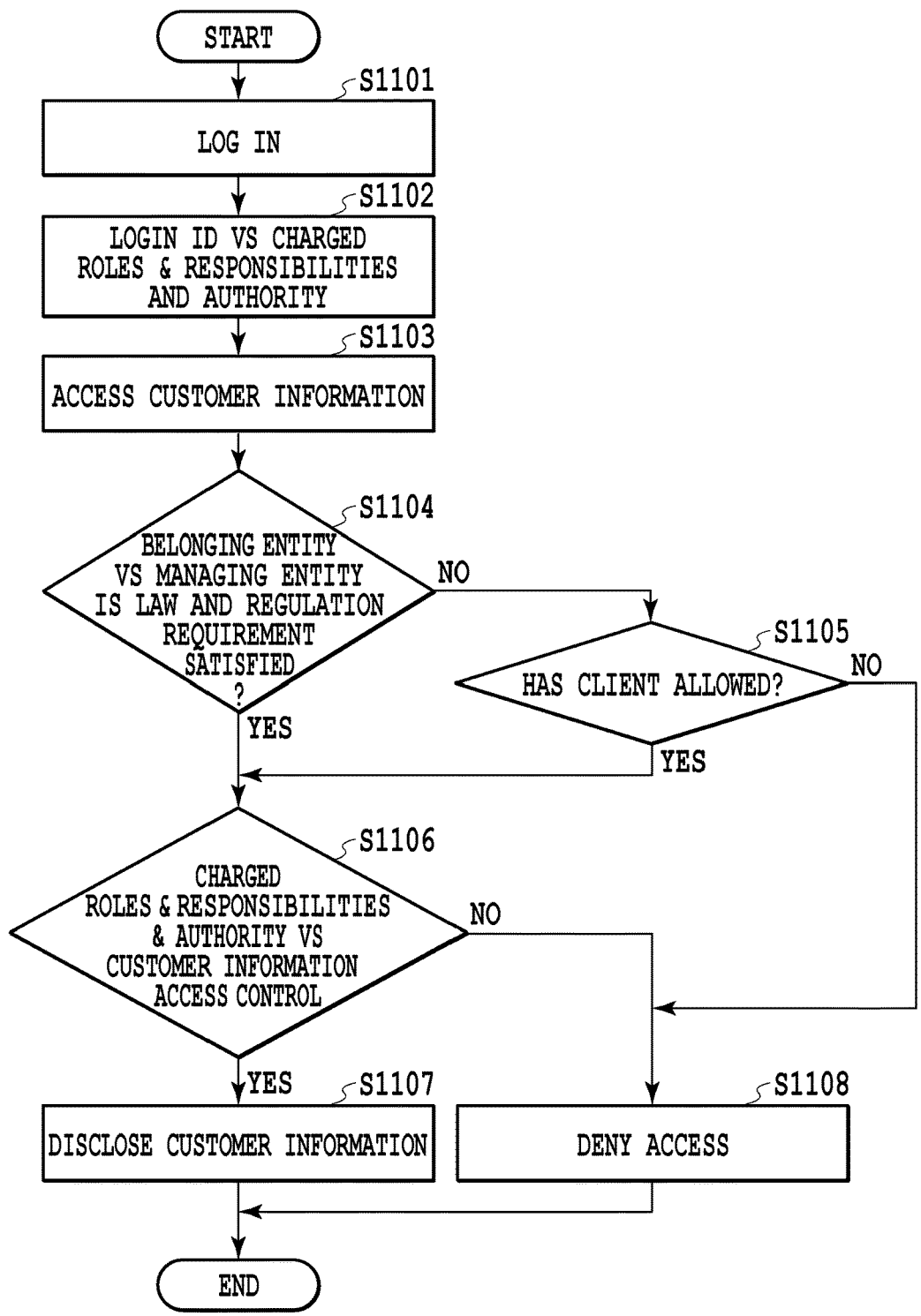
FIG. 11 is a flowchart illustrating a flow of an access control process for a user belonging to a credit department in a third country in a case in FIG. 9, according to an embodiment of the present invention.

FIG. 11 is a flowchart illustrating a flow of an access control process for a user (user ID: U0002) belonging to the credit department in the third country in the case in FIG. 9 according to an embodiment of the present invention.

In step 1101, the user (user ID: U0002) belonging to the credit department located in the third country 9300 and having the charged roles & responsibilities and authority of the credit department logs in.

In step 1102, the user information linkage and accessibility determination unit 210 references the user information 400 to determine the roles & responsibilities, the belonging entity ID, and the belonging entity group ID corresponding to the user ID used for the login. In the present example, based on the user information 400, the user information linkage and accessibility determination unit 210 determines that the user (user ID: U0002) is a user belonging to the entity ID: OG0001 to 0004 belonging to the entity group ID: OG001, and being in charge of the roles & responsibilities of the credit department (EX).

In step 1103, the user (user ID: U0002) accesses the customer information (in the present example, the information on the business company X) in order to determine the credit conditions and the like. In the present step, the user information linkage and accessibility determination unit 210 references the customer information 600 to determine the entity mainly managing the customer information requested to be accessed. Moreover, in the present step, the user information linkage and accessibility determination unit 210 references the customer information 600 to determine the information type and information item ID of the customer information requested to be accessed. In the present step and the following steps, instead of the configuration in which the user information linkage and accessibility determination unit 210 references the customer information 600 and the like, a configuration may be adopted in which a request is submitted to the customer information management unit 220, which then references the customer information 600 and the like.

In step 1104, the user information linkage and accessibility determination unit 210 determines whether the entity managing the customer information and the entity to which the user (user ID: U0002) attempting to access the information belongs belong to the same entity group. In the present example, in a case where the first-country entity 9101 managing the customer information related to the access and the third-country entity 9103 to which the user (user ID: U0002) belongs belong to the same entity group, the process shifts to step 1106. The present embodiment has been described with the assumed requirement that the entity managing the customer information and the entity to which the user attempting to access the information belongs belong to the same entity group. However, the requirement may be that the entity managing the customer information and the entity to which the user attempting to access the information belongs belong to the same area (for example, Asia or Europe) or have the same type of laws and regulations.

In step S1104, when the requirement is determined not to be satisfied, the user information linkage and accessibility determination unit 210 determines whether consent for the disclosure of the customer information on the business company X has been provided by the business company X. In a case where no consent has been provided, access denial is determined in step 1108, and the process is ended.

In step 1105, upon confirming the client's consent, the user information linkage and accessibility determination unit 210 shifts to step 1106.

In step 1106, the user information linkage and accessibility determination unit 210 references the access authority table 700 for each type of customer information to determine whether the customer information is accessible with the roles & responsibilities associated with the ID of the login user. In the present example, the entity to which the user (user ID: U0002) attempting to access the information belongs belongs to the same entity group. For example, the type of the customer information that the user attempts to access is assumed to be the basic information, and the business company X is assumed to be an another-entity managed office for which the information is managed by another entity. The user information linkage and accessibility determination unit 210 references the access authority table 700 for each type of customer information to determine that the user (user ID: U0002) having the charged roles & responsibilities and authority of the credit department is allowed to access the information (bank employees belonging to the credit department are enabled to inspect all the information other than insider information).

In step 1107, in a case where the access is determined to be allowed in step 1106, the customer information is disclosed and the process is ended.

Figure 12:
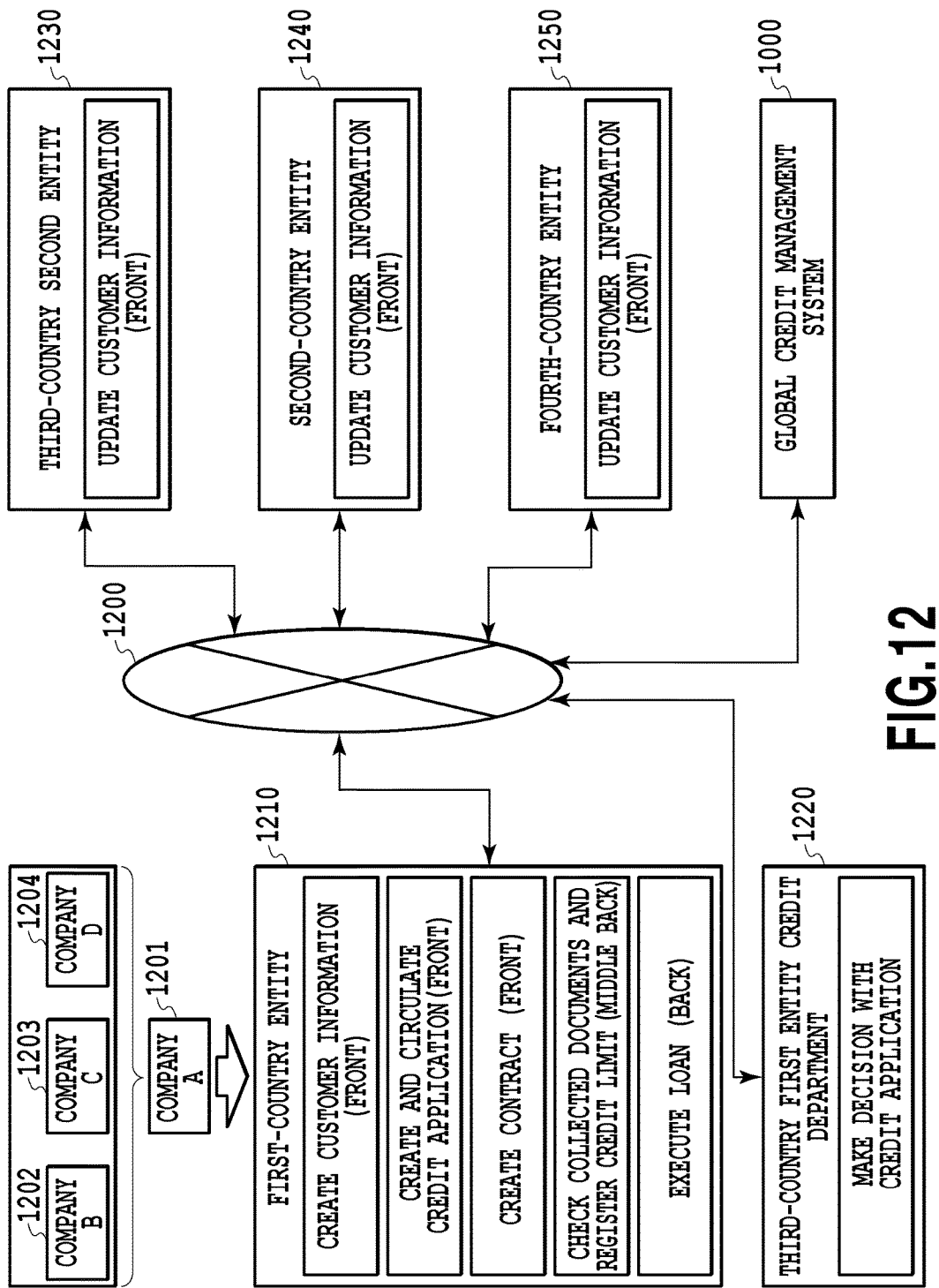
FIG. 12 is a diagram illustrating a whole picture of an exemplary embodiment in structured finance according to another embodiment of the present invention.

FIG. 12 is a diagram illustrating a whole picture of an exemplary embodiment for structured finance according to another embodiment of the present invention. The present embodiment will be described taking, as an example, execution of project finance including the following related parties.

Borrower: a specific purpose company A 1201 with a head office located in London, Sponsor (investment ratio of 50% or more: virtually same borrower): a company B 1202 with a head office located in New York, Constructor (affiliate): a company C 1203 a head office located in Tokyo, and Sale target (affiliate): a company D 1204 with a head office in New Delhi.

The company A 1201, which is a borrower, consults a first-country entity 1210 located in Britain, which is a first country, about financing. The customer information on the company B 1202 with a head office in New York is managed by a second-country entity 1240 located in the U.S., which is a second country. The customer information on the company C 1203 is managed by a third-country second entity 1230 located in Japan, which is a third country. The customer information on the company D 1204 is assumed to be managed by a fourth-country entity 1250 located in India, which is a fourth country. A decision for the credit application is made by a third-country first entity 1220 located in Japan, which is the third company.

Figure 13A:
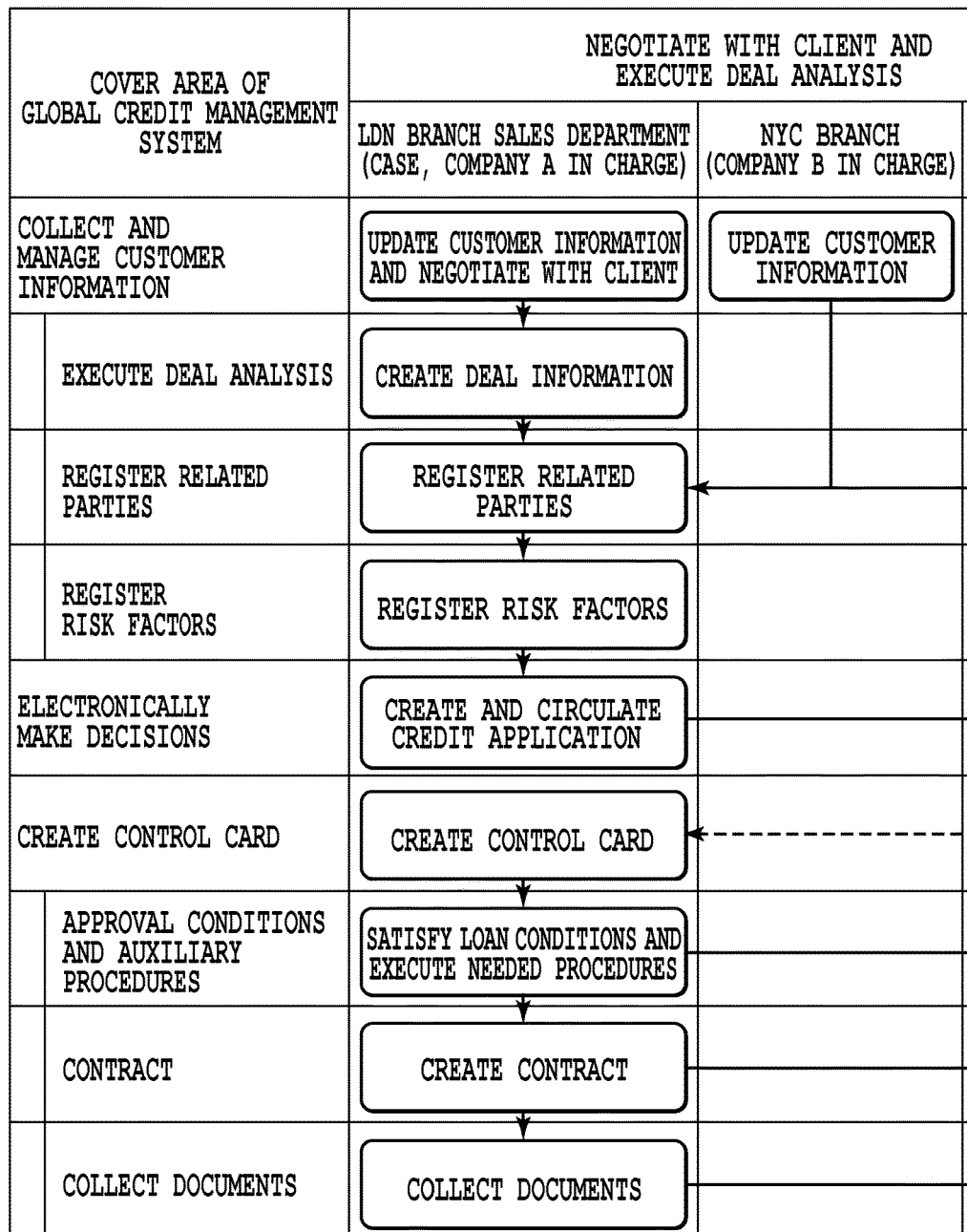
FIG. 13A is a diagram illustrating an exemplary workflow in structured finance according to another embodiment of the present invention.
Figure 13B:
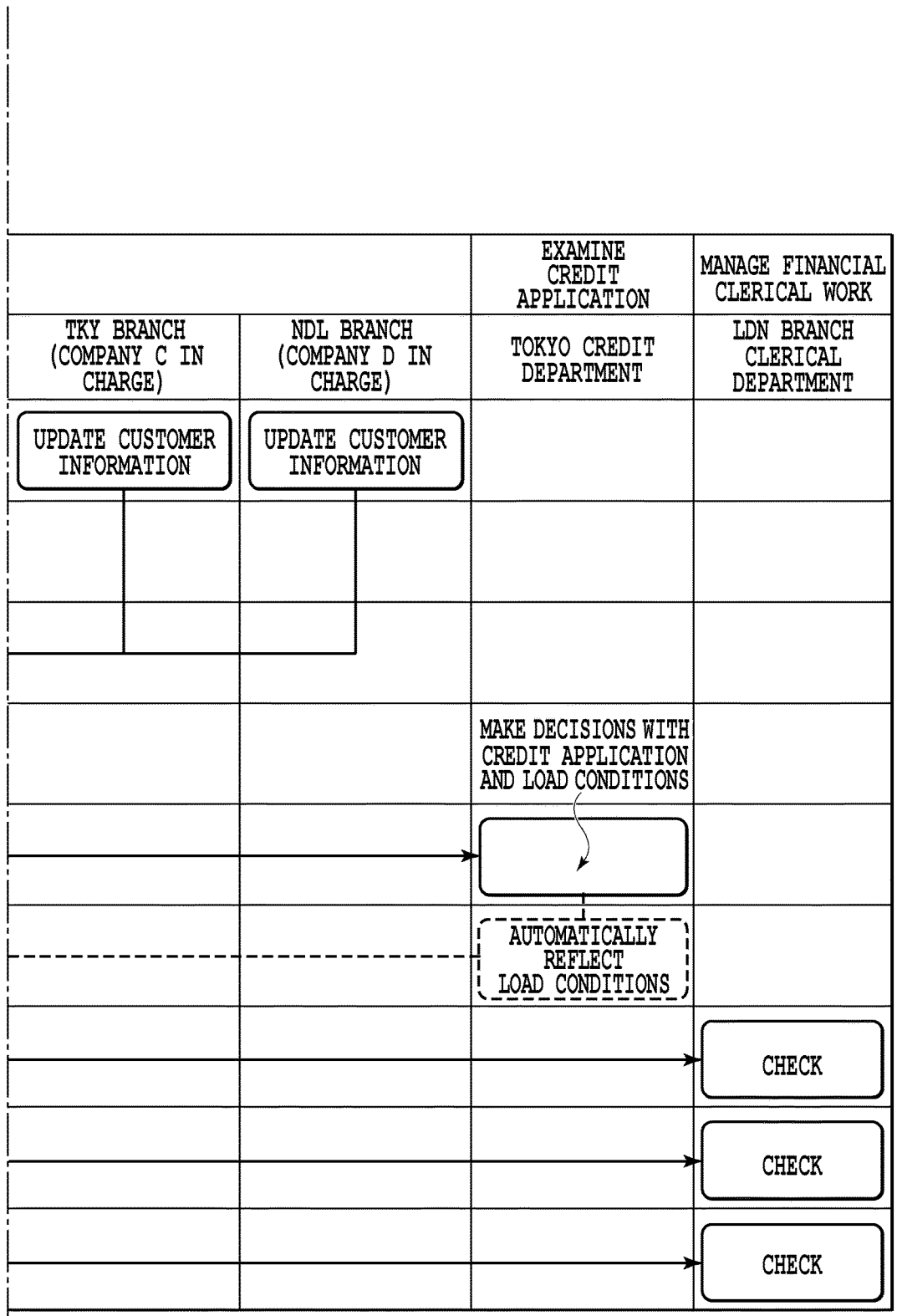
FIG. 13B is a diagram illustrating an exemplary workflow in structured finance according to another embodiment of the present invention.

FIGS. 13A and 13B is a diagram illustrating an exemplary workflow for structured finance according to another embodiment of the present invention.

Works corresponding to the roles of the first-country entity 1210, the second-country entity 1240, the third-country second entity 1230, and the fourth-country entity 1250 are generated in these entities along the workflow in FIG. 12. A person in the first-country entity 1210 having the role of the front creates or updates the customer information on the specific purpose company A 1201, creates deal information and multiple-parties deal information, registers risk factors, and creates a credit application. The third-country first entity 1220 makes a decision for the credit application. Subsequently, the first-country entity 1210 creates a contract, and a person having the role of the middle back checks collected documents and registers a credit limit. In a case where all the procedures go along smoothly, a person having the role of the back finally executes lending. At this time, in performing the assigned roles & responsibilities, a person having an authority corresponding to each roles & responsibilities needs to reference the customer information. For a certain finance of a structured finance type, when credit decisions are made, persons in each office having the charged roles & responsibilities and authorities of the front, the middle back, and the like need to reference the deal information registered in the deal information management database 231 and further reference related-party information associated with the deal information.

In the present example, the clients' information on the companies A to D is managed by the first-country entity 1210, the second-country entity 1240, the third-country second entity 1230, and the fourth-country entity 1250. Thus, a user belonging to the first-country entity 1210 and having the front job position needs to create a credit application and the like by checking the customer information (in the present example, the related party information) managed by other offices (the second-country entity 1240, the third-country second entity 1230, and the fourth-country entity 1250). On the other hand, users belonging to the second-country entity 1240, the third-country second entity 1230, and the fourth-country entity 1250 and having the front job position need to update each piece of the customer information and reflect the resultant information in the related party registration. The related party information and the customer information are linked with each other, and thus, update of the customer information by each entity updates the related party information. Furthermore, in contrast, update of the related party information by each entity updates the corresponding customer information.

Description will be given with reference to the following figure taking, as an example, an access control flow for a user belonging to the first-country entity 1210 and having the front job position.

Figure 14:
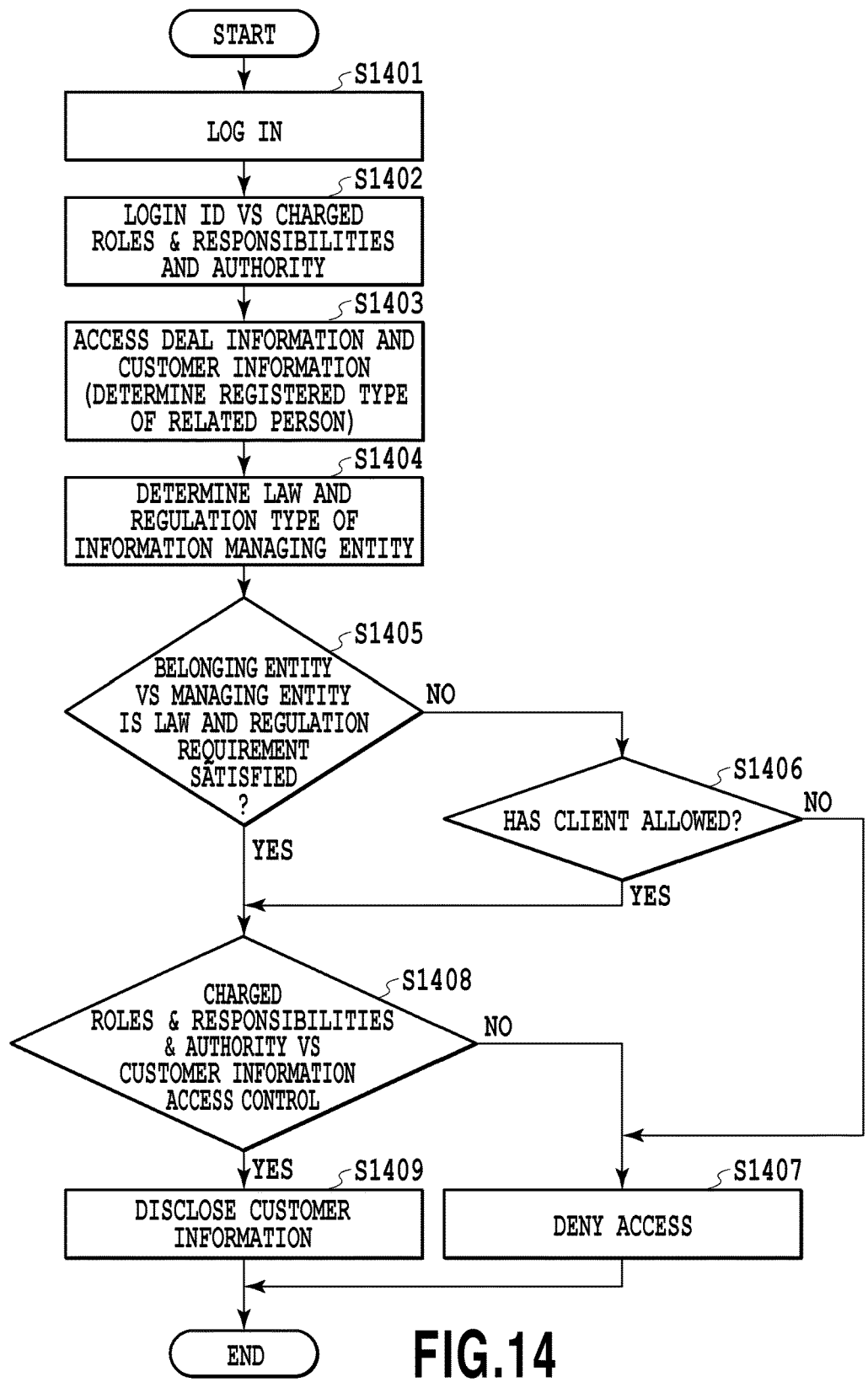
FIG. 14 is a flowchart illustrating a flow of a process executed in the present invention according to another embodiment of the present invention.

FIG. 14 is a flowchart illustrating a flow of a process executed in the present invention according to another embodiment of the present invention. As described above, based on the case in FIG. 12, description will be given taking, as an example, an access control flow for a case where the user belonging to the first-country entity 1210 located in the first country and having the front job position accesses the customer information managed by the other offices (the second-country entity 1240, the third-country second entity 1230, and the fourth-country entity 1250).

In step 1401, the user logs in to the bank system 1500 of the entity group to which the user belongs. For example, the bank system 1500 to which the user logs in may be a system common to all the entity groups or one of separate systems for the respective countries or entity groups in a case where the bank system 1500 is linked with the global credit management system 1000.

In step 1402, the user information linkage and accessibility determination unit 210 references the user information 400 to determine the roles & responsibilities, the belonging entity ID, and the belonging entity group ID corresponding to the user ID used for the login.

In step 1403, in order to determine the credit conditions and the like and create a credit application, the user accesses the deal information registered in the deal information management database 231 and the related party information (in the present example, the information on the companies A to D) associated with the deal information. In the present step, through linkage with the customer information management unit 220, the deal information management unit 230, and the multiple-parties deal information management unit 240, the user information linkage and accessibility determination unit 210 determines the entity mainly managing the customer information (the information on the companies A to D) and the registered types of the related person. In the present example, description will be given, for example, on the assumption that the customer information on the company D 1204 is referenced. The user information linkage and accessibility determination unit 210 references the customer information 600 to determine an entity managing the customer information related to the access. Furthermore, the user information linkage and accessibility determination unit 210 determines the registered type of the related person (in the present example, the affiliate). Moreover, the user information linkage and accessibility determination unit 210 references the customer information 600 to determine the information type and information item ID of the customer information requested to be accessed. In the present step and the following steps, instead of the configuration in which the user information linkage and accessibility determination unit 210 references the customer information 600 and the like, a configuration may be adopted in which a request is submitted to the customer information management unit 220 or the like, which references the customer information 600 and the like.

In step 1404, the user information linkage and accessibility determination unit 210 references the type information 800 for the laws and regulations in each country and the entity information 500 to determine the law and regulation type of the entity managing the customer information. In the present example, the type of the laws and regulations for the entity managing the customer information requested to be accessed is assumed to be 1.

In step 1405, based on the relation between the entity to which the user attempting to access the information belongs and the entity managing the customer information, whether the requirement for the laws and regulations in each country is satisfied is determined. In the present example, the law and regulation type determined in step 1404 enables the determination that the entity to which the login user belongs i) belongs to the same entity group to which the entity managing the customer information belongs and ii) is located in the same country where the entity managing the customer information is located. The first-country entity 1210 to which the user belongs belongs to the same entity group to which the fourth-country entity 1250 managing the customer information belongs (the condition (i) is satisfied), while not belonging to the same country to which the fourth-country entity 1250 managing the customer information belongs (the condition (ii) is not satisfied). Therefore, the process shifts to step 1406.

In step 1406, the user information linkage and accessibility determination unit 210 determines whether consent for the disclosure of the customer information has been provided by the client D 1204. The client's consent may of course be comprehensive consent for all of the customer information or consent for each information type or each information item. In a case where no consent has been provided, access denial is determined in step 1407, and the process is ended.

In step 1408, the user information linkage and accessibility determination unit 210 references the access authority table 700 for each type of customer information to determine whether the customer information is accessible with the roles & responsibilities associated with the login user ID. In the present example, the first-country entity 1210 to which the user attempting to access the information belongs to the same entity group to which the fourth-country entity 1250 managing the customer information belongs. For example, the customer information type that the user attempts to access is the basic information (information item ID: B0001) and the registered type of the person related to the client D 1204 is assumed to be an affiliate. The user information linkage and accessibility determination unit 210 references an affiliate section for the another-entity managed office in the same entity group in the access authority table 700 for each type of customer information. The user information linkage and accessibility determination unit 210 then determines that the user having the roles & responsibilities of the front is allowed to access the information.

In step 1409, in a case where the access is determined to be allowed in step 1408, the customer information is disclosed and the process is ended.

Moreover, as a modification, an example where the client company B 1202 (related party information) is referenced will further be described. The processing up to step 1403 is the same. In step 1404, the user information linkage and accessibility determination unit 210 is assumed to reference the type information 800 for the laws and regulations in each country and the entity information 500 to determine that the type of the laws and regulations in the country where the second-country entity 1240 managing the customer information on the client company B 1202 is located is 3.

In step 1405, the user information linkage and accessibility determination unit 210 determines whether the requirement for the laws and regulations in each country is satisfied based on the relation between the entity to which the user attempting to access the information belongs and the entity managing the customer information. In the present example, the law and regulation type determined in step 1404 indicates that the information can be shared regardless of the entity group and the country, and the process shifts to step 1408.

In step 1408, the user information linkage and accessibility determination unit 210 references the access authority table 700 for each type of customer information to determine whether the customer information is accessible with the roles & responsibilities associated with the login user ID. In the present example, the first-country entity 1210 to which the user attempting to access the information belongs belongs to the same entity group to which the second-country entity 1240 managing the customer information belongs. Then, for example, the customer information type attempting to access the information is the basic information (information item ID: B0001), and for the client company B 1202, the registered type of the person related to the project is the virtually same borrower. Therefore, the user information linkage and accessibility determination unit 210 references a virtually same borrower section for the another-entity managed office in the same entity group business partner in the access authority table 700 for each type of customer information. The user information linkage and accessibility determination unit 210 then determines that the user having the roles & responsibilities of the front is allowed to access the information.

In this manner, the present invention is applicable not only to the customer information managed for each client but also to access control for a case where the deal information managed for each deal is inspected FIG. 15 illustrates an example of a configuration of the bank system 1500 and the global credit management system 1000 according to an embodiment of the present invention.

The bank system 1500 in each office has an authentication server 1530, a service server 1520, and a terminal 1540 used for each work by an bank employee. The server and the terminal are illustrative, and a variety of other servers and terminal groups may of course exist. The bank system 1500 may vary among the countries and the entity groups or may be a unified system. Furthermore, in the present example, the bank system 1500 and the global credit management system 1000 have been described as different systems, but may of course be designed as the same unified system. The bank system 1500 and the global credit management system 1000 are connected together via an in-house network or the Internet 1550. The global credit management system 1000 includes one or more server computers and a database.

The terminals 1540 and the server computers forming the bank system 1500 and the global credit management system 1000 each include a ROM 1501, a RAM 1502, a storage unit 1503 (a magnetic storage device or any medium that is used to store information and that may be accessed), a communication unit 1504, an input unit 1505, a display unit 1506, and a CPU 1507. The present invention is not limited to these components, but various types of hardware known in the present technical field can be built into or connected to the system. Furthermore, an OS and various drivers or applications are installed in each of the terminals 1540 and various servers to execute various processes in the embodiments of the present invention.

The embodiments disclosed in the specification and in the drawings are illustrative only, and interpretation should not be limited to the contents of the disclosure in a case where the technical scope of the present invention is determined. For the sake of description, the processing units have been separately described. However, the function of the processing units may be integrated and linked together such that a part or all of the roles & responsibilities of each unit is possessed by another unit. The group of databases disclosed in the present embodiment may also be integrated and linked together such that a part or all of the data in each database is possessed by another database.

As described above, according to the present invention, the system available to the bank employees in all the offices allows the appropriate access control to be performed while linking the pieces of information with one another within the common framework and complying with the laws and regulations varying among the countries, thus enabling the appropriate information to be disclosed to the appropriate persons.

The invention claimed is:

1. A control method for access to information, the method being executed by a global credit management system, the global credit management system comprising at least one information management unit, at least one corresponding database storing information to be provided by the at least one information management unit and an accessibility determination unit, and the method comprising:
   receiving, by the accessibility determination unit, a login ID of a user;

determining, by the accessibility determination unit, roles & responsibilities associated with the login ID and an entity to which the user belongs;

receiving, by at least one information management unit, a request for access to an information stored in the at least one corresponding database;

extracting, by the at least one information management unit from the at least one corresponding database, conditions necessary for accessing information stored in the at least corresponding database, and providing, by the at least one information management unit, the extracted conditions to the accessibility determination unit; and determining, by the accessibility determination unit based on the conditions, accessibility of information that the user attempts to access, wherein determining the accessibility is executed based on:
  a) determining an entity managing information that the user attempts to access;
  b) determining an access control pattern based on laws and regulations associated with the entity managing the information that the user attempts to access;
  c) determining whether the access control pattern based on the laws and regulations is satisfied based on a relation between the entity to which the user belongs and the entity managing the information that the user attempts to access, wherein determining by the global credit management system that access is enabled only when the entity to which the user belongs, belongs to the same entity group to which the entity managing the access control pattern of the requested information belongs and is located in the same country where the entity managing the access control pattern of the requested information is located;
  d) determining whether the information that the user attempts to access is accessible with the roles & responsibilities associated with the login ID.

2. The control method for access according to claim 1, wherein the information is partitioned based on a content of the information, and the appropriate roles & responsibilities are assigned to each piece of the partitioned information.

3. The control method for access according to claim 1, wherein the information includes at least one of customer information on a customer and deal information for credit regarding the customer.

4. The control method for access according to claim 1, wherein the information that the user attempts access when making credit decisions for financing of a structured finance type is customer information on a registered related party related to the financing of the structured finance type, and
  determining accessibility of the customer information that the user attempts to access further has:
    determining a registered type of a party related to the financing of the structured finance type in the customer information that the user attempts to access;
    determining roles & responsibilities assigned to the determined registered type of the related party; and
    determining whether the roles & responsibilities associated with the login ID satisfies the roles & responsibilities assigned to the determined registered type of the related party.

5. The control method for access according to claim 4, wherein the registered types of the related party include at least a borrower, a virtually same borrower, an affiliate, and a related party.

6. The control method for access according to claim 1, wherein c) further includes determining that access is enabled when a customer's consent is provided.

7. A global credit management system comprising a hardware processor, the system comprising at least one information management unit, at least one corresponding database storing information to be provided by the at least one information management unit and an accessibility determination unit that are implemented by at least in part the hardware processer, the system configured to:
  receive, by the accessibility determination unit, a login ID of a user;
  determine, by the accessibility determination unit, roles and responsibilities associated with the login ID and an entity to which the user belongs;
  receive, by at least one information management unit, a request for access to an information stored in the at least one corresponding database;
  extract, by the at least one information management unit from the at least one corresponding database, conditions necessary for accessing information stored in the at least corresponding database, and provide, by the at least one information management unit, the extracted conditions to the accessibility determination unit; and
  determine, by the accessibility determination unit based on the conditions, accessibility of information that the user attempts to access, wherein determining the accessibility is executed based on:
    a) determining an entity managing information that the user attempts to access;
    b) determining an access control pattern based on laws and regulations associated with the entity managing the information that the user attempts to access;
    c) determining whether the access control pattern based on the laws and regulations is satisfied based on a relation between the entity to which the user belongs and the entity managing the information that the user attempts to access, wherein determining by the global credit management system that access is enabled only when the entity to which the user belongs, belongs to the same entity group to which the entity managing the access control pattern of the requested information belongs and is located in the same country where the entity managing the access control pattern of the requested information is located; and
    d) determining whether the information that the user attempts to access is accessible with the roles and responsibilities associated with the login ID.

8. The global credit management system according to claim 7, wherein determining the accessibility is executed is further based on c) comprising determining that access is enabled when a customer's consent is provided.

9. A non-transitory computer readable storage medium storing a program for allowing a global credit management system comprising a hardware processor to execute a method, the system comprising at least one information management unit, at least one corresponding database storing information to be provided by the at least one information management unit and an accessibility determination unit that are implemented by at least in part the hardware processer, the method comprising:
  receiving, by the accessibility determination unit, a login ID of a user;
  determining, by the accessibility determination unit, roles and responsibilities associated with the login ID and an entity to which the user belongs;

receiving, by at least one information management unit, a request for access to an information stored in the at least one corresponding database;

extracting, by the at least one information management unit from the at least one corresponding database, conditions necessary for accessing information stored in the at least corresponding database, and providing, by the at least one information management unit, the extracted conditions to the accessibility determination unit; and determining, by the accessibility determination unit based on the conditions, accessibility of information that the user attempts to access, wherein determining the accessibility is executed based on:
   a) determining an entity managing information that the user attempts to access;
   b) determining an access control pattern based on laws and regulations associated with the entity managing the information that the user attempts to access;
   c) determining whether the access control pattern based on the laws and regulations is satisfied based on a relation between the entity to which the user belongs and the entity managing the information that the user attempts to access, wherein determining by the global credit management system that access is enabled only when the entity to which the user belongs, belongs to the same entity group to which the entity managing the access control pattern of the requested information belongs and is located in the same country where the entity managing the access control pattern of the requested information is located; and
   d) determining whether the information that the user attempts to access is accessible with the roles and responsibilities associated with the login ID.

10. The non-transitory computer readable storage medium storing a program for allowing the hardware processor in the global credit management system to execute the method according to claim 9, wherein c) further includes determining that access is enabled when a customer's consent is provided.

* * * * *